United States Patent
Sangiacomo

(10) Patent No.: US 10,798,956 B2
(45) Date of Patent: Oct. 13, 2020

(54) FOOD BASED ON POPCORN AND CHEESE, AND RESPECTIVE PRODUCTION METHOD

(71) Applicant: SAN LUCIO S.R.L., San Gervasio Bresciano (BS) (IT)

(72) Inventor: Francesca Sangiacomo, San Gervasio Bresciano (IT)

(73) Assignee: SLB S.R.L., Brescia (IT)

( * ) Notice: Subject to any disclaimer, the term of this patent is extended or adjusted under 35 U.S.C. 154(b) by 342 days.

(21) Appl. No.: 15/352,042

(22) Filed: Nov. 15, 2016

(65) Prior Publication Data

US 2017/0055560 A1    Mar. 2, 2017

Related U.S. Application Data

(62) Division of application No. 14/358,384, filed as application No. PCT/IB2012/056558 on Nov. 20, 2012, now abandoned.

(30) Foreign Application Priority Data

Nov. 22, 2011 (IT) ................ BS2011A0158

(51) Int. Cl.
| A23L 7/191 | (2016.01) |
|---|---|
| A23P 20/10 | (2016.01) |
| A23C 19/09 | (2006.01) |
| A23L 5/30 | (2016.01) |
| A23L 5/10 | (2016.01) |
| A23P 20/18 | (2016.01) |
| A23P 20/12 | (2016.01) |

(52) U.S. Cl.
CPC ............. *A23L 7/191* (2016.08); *A23C 19/09* (2013.01); *A23L 5/15* (2016.08); *A23L 5/34* (2016.08); *A23P 20/10* (2016.08); *A23P 20/12* (2016.08); *A23P 20/18* (2016.08); *A23V 2002/00* (2013.01)

(58) Field of Classification Search
CPC ........... A23L 7/122; A23L 7/191; A23L 7/161
USPC ........................ 426/289, 296, 445
See application file for complete search history.

(56) References Cited

U.S. PATENT DOCUMENTS

| 2,222,560 | A | | 11/1940 | Clickner | |
|---|---|---|---|---|---|
| 4,409,453 | A | * | 10/1983 | Smith | A21B 1/245 219/400 |
| 4,904,487 | A | | 2/1990 | Labaw et al. | |
| 4,927,645 | A | * | 5/1990 | Lee | A23L 7/191 426/103 |
| 5,023,096 | A | | 6/1991 | Plochman | |
| 5,208,055 | A | * | 5/1993 | Plochman | A23C 19/086 426/307 |
| 5,298,268 | A | | 3/1994 | Maegli | |
| 5,305,687 | A | * | 4/1994 | Cantrell | A47J 43/20 220/4.22 |
| 5,585,127 | A | * | 12/1996 | Freeport | A23P 20/12 426/302 |
| 5,688,543 | A | * | 11/1997 | Freeport | A23P 20/12 426/302 |
| 5,753,287 | A | * | 5/1998 | Chedid | C12Y 302/01001 426/102 |
| 6,846,502 | B1 | * | 1/2005 | Billmers | A23P 20/12 426/289 |
| 7,569,242 | B2 | * | 8/2009 | Barber | A23P 20/12 426/289 |
| 8,216,620 | B2 | * | 7/2012 | Heywood | A23P 20/12 426/808 |
| 9,346,604 | B2 | * | 5/2016 | Thomas | B65D 77/02 |
| 2008/0008790 | A1 | | 1/2008 | Jensen et al. | |
| 2011/0212226 | A1 | * | 9/2011 | Soane | A23P 20/12 426/96 |
| 2012/0288590 | A1 | * | 11/2012 | Soane | A23P 20/12 426/92 |
| 2014/0272034 | A1 | * | 9/2014 | Kanafani | A23P 1/083 426/272 |

FOREIGN PATENT DOCUMENTS

EP          0423650 A2     4/1991

OTHER PUBLICATIONS https://www.merriam-webster.com/dictionary/cook, retrieved by the examiner Dec. 20, 2019.*
Jakicic, Cathryn, downloaded from https://www.tasteofhonne.com/article/the-secret-trick-to-making-cheese-crisps/ on Apr. 20, 2020 (Year: 2020).*
Tenderspot: "Egal ob suB, salzig oder pur; Wir suchen das perfekte Popcorn-Rezept!", http://dampfgarbeutel.trnd.com/2010/05/19/egal-ob-sus-salzig-oder-pur-wir-suchen-das-perfekte-popcorn-rezept/ ; entry of user "tenderspot"; p. 2.
Nora Singley, http://www.thekitchn.com/hold-the-butter-cheesy-popcorn-146259, published on the Internet May 11, 2011.

* cited by examiner

*Primary Examiner* — C. Sayala
(74) *Attorney, Agent, or Firm* — Volpe and Koenig, P.C.

(57) ABSTRACT

A method is provided for producing at least one popcorn grain substantially entire and coated, completely or partially, with at least a first layer of a first melted cheese directly in contact with the popcorn grain. The first melted cheese has an initial moisture content of less than 35%, or alternatively, the first melted cheese is cooked too and its moisture after cooking is lower than 8%. A second layer of a second cheese may be applied to the food product.

8 Claims, 4 Drawing Sheets

FOOD BASED ON POPCORN AND CHEESE, AND RESPECTIVE PRODUCTION METHOD

CROSS REFERENCE TO RELATED APPLICATIONS

This application is a divisional of U.S. patent application Ser. No. 14/358,384, filed May 15, 2014, which is a US National Stage Entry of PCT/IB2012/056558 filed Nov. 20, 2012, which claims the benefit of Italian Patent Application BS2011A000158, filed on Nov. 22, 2011. The entire contents of which are incorporated by reference herein as if fully set forth.

BACKGROUND

It has been known to produce popcorn-based foods in the food industry. For the purposes of the present invention, the term popcorn refers to corn which is cooked up to make it explode, i.e. to cause the endosperm to be ejected out of the grains.

Foods containing popcorn and melted cheese with a high moisture content have been proposed, generally in the form of breaks or snacks sold through the retail channel. Usually, these products should be stored in a cold environment, such as a refrigerated section of a supermarket.

For the purposes of the present invention, cheeses with a high moisture content are defined as those cheeses having a moisture .content of more than 35% when used, for the production of the snack. Cheeses with a low moisture content are defined as those cheeses having a moisture content of less than 35% when used for the production of the snack.

The methods employed to measure the moisture content are known to one skilled in the art.

European Patent EP 0423650 describes a snack comprising a plurality of superimposed, alternating layers of melted Mozzarella cheese, which is a soft texture cheese with a high moisture content, and milled popcorn. Particularly, Mozzarella cheese is obtained from partially skimmed milk (col. 2, lines 43-45). The first layer of the snack, i.e. the uniform layer forming the base thereof, is prepared by adding grated Mozzarella cheese to a container and then heating the Mozzarella cheese up to melt it; the melted Mozzarella cheese is subsequently frozen and covered with a layer of grated popcorn obtained by milling a plurality of exploded corn grains. A certain amount of grated Mozzarella cheese is delivered onto the popcorn layer so as to fill the gaps yet without completely covering the flakes of popcorn; the second layer of Mozzarella cheese is also heated up to melt it. Nevertheless at this step it is important to prevent the melted Mozzarella cheese from completely enclosing the flakes of popcorn as the moisture released from the Mozzarella cheese would irreversibly spoil the popcorn (col. 3, lines 48-55, col. 4, lines 5-12), thereby preventing a successful preservation thereof; moisture would promote the growth of mold in the product. However, the amount of Mozzarella cheese used to form the corresponding second layer must be sufficient to ensure a minimum cohesion between the layers of the snack (col. 3, lines 48-55). Practically, the amount of Mozzarella cheese forming the second layer is generally from 1.5 to 2 times the amount used to form the first layer. Immediately after the second layer of Mozzarella cheese has been melted, the snack is rapidly cooled in a freezer up to a temperature of approximately −23° C. The duration of the cooling step is limited to 15 seconds. The cooled snack is then lyophilized and packaged.

The above-described snack suffers from some major drawbacks. For example, its three-layer structure is not particularly cohesive; the snack crumbles easily, resulting in a waste of product and making its consumption unpleasant. Furthermore, the snack can only be preserved by lyophilization as the Mozzarella cheese tends to release much of its initial moisture content; the lyophilization method requires high amounts of energy and time.

U.S. Pat. No. 2,222,560 describes a snack based on entire popcorn grains each coated with a cheese which is mixed with fat at a ratio of 35/65% by weight. In other words, most of the coating consists of fat.

Other examples of known snacks are provided in U.S. Pat. Nos. 5,298,268 and 4,904,487.

Canadian Patent Application CA-A-2087211 describes a snack comprising a Cheddar type melted cheese, which falls within the definition given above for a cheese with a high moisture content—even if ripened—along with grated popcorn. The snack includes a single layer obtained by pre-mixing the popcorn flakes with the cheese prior to melting the cheese. Also in this case, the snack is lyophilized to allow the snack to be preserved over time.

Undoubtedly, a snack which does not make use of milled popcorn is attractive for a large group of consumers. For example, it may be more practical to consume a snack wherein the popcorn grains are discrete and not in the form of a bar. The above-described snacks cannot be produced using entire popcorn grains because such grains cannot be preserved for a long time.

Generally, it is desirable to minimize the amount of energy used for the production of popcorn- and cheese-based snacks, particularly the electrical energy used for the lyophilization, as well as to reduce the calorie intake provided by the snacks.

SUMMARY

It is an object of the present invention to provide a popcorn- and cheese-based food which is not-required to be lyophilized in order to be preserved for a long time, even if the food is not treated with preservatives.

It is another object of the present invention to provide a popcorn- and cheese-based food which retains its own organoleptic characteristics almost unchanged for a long time without growing moldy, even if it is not stored in a refrigerator and even if its fat content is low or zero.

It is a further object of the present invention to provide a food comprising entire or substantially entire popcorn grains as well as cheese, which is simple to be produced and mechanically stable in the structure, i.e. a food which does not crumble.

It is still another object of the present invention to provide a method for the production of the aforesaid food which requires a minimum consumption of energy.

Therefore, in a first aspect, the present invention relates to a popcorn- and cheese-based food according to claim 1.

Particularly, the food according to the invention comprises at least one popcorn grain substantially entire and coated, completely or partially, with at least a first layer of a first melted cheese directly in contact with the popcorn grain, wherein:

a) said first melted cheese is of a low moisture content type, i.e., it has an initial moisture content of less than 35% prior to be melted on popcorns, or alternatively, b) said first melted cheese is cooked and its moisture after cooking is lower than 8%.

When compared to known foods, the food according to the present invention is characterized in that the finished food has a moisture content of less than 8% and it is not lyophilized whether the first cheese has either the afore said feature a) or the aforesaid feature b).

Unlike traditional solutions, the first cheese in the food according to the invention is either a cheese with a low initial moisture content or a cheese which is cooked and not simply melted regardless of the initial moisture content thereof.

The cheese is melted at medium temperatures without forming neither air bubbles in the cheese nor crispy crusts of cheese, and especially, the melted cheese substantially retains its initial moisture content with moisture losses of less than 10%.

The cheese is cooked at high temperatures with the formation of small air bubbles during cooking; the cooked cheese remains—crispy and its residual moisture content is significantly lower than the initial moisture content, with moisture losses of more than 30% as compared to either the cheese prior to be cooked or the same cheese as simply melted.

According to the definition given above, the first cheese has a moisture content of less than 35% just prior to be melted onto the popcorn grain; otherwise, when the first cheese is cooked, it has a very low moisture content after being cooked, i.e. the moisture content of the food is less than 8%, preferably less than 5%, and more preferably in the range of 2%-5%.

However, a first cheese with a low initial moisture content retains a low moisture content after being melted onto the popcorn. Similarly, a first cheese loses most of its moisture after being cooked (regardless of its initial moisture content).

Main features of the most popular cheeses are shown, for example, in Table 14.1, pages 495-496 of the "Treaty of Dairy Technology" by Ottavio Salvadori del Prato, CALDERINI EDAGRICOLE eds., ISBN 88-206-4110-0.

A cheese suitable for the production of the snack according to the present invention is, for example, the Grana cheese which has a moisture content of approximately 32-33%; once this cheese has been cooked, its moisture content readily falls below 5%. Under these conditions, the amount of residual moisture in the cheese which eventually would be absorbed by the endosperm of the popcorn is minimal, and the salt content of the cheese, whose concentration increases as the moisture is reduced, hinders the phenomena of degradation of the popcorn itself, which therefore can be preserved for a long time without growing moldy even if the food is not treated with preservatives and even if it is not stored in a refrigerator.

In other words, the food according to the present invention is preserved for a long time, for example six months or one year, even if it is not added with preservatives nor stored in a refrigerator, due to both the minimal residual moisture content of the cheese which could be potentially absorbed by the popcorn and the relatively high salt content thereof.

To this regard, it is important that the first layer of the first cheese is directly contacting the endosperm of the popcorn; both the reduced moisture content and the salt presence protect the popcorn from phenomena of degradation.

Advantageously, the just-described arrangement allows obtaining the food from entire popcorn grains which are not milled. Milling the popcorn grains into small-sized flakes undoubtedly facilitates the method of lyophilization of the snacks and allows the moisture absorbed by the cheese to be spread across a large surface of the popcorn. In the food according to the present invention, lyophilization is not required as the amount of moisture which can be absorbed by the popcorn is tolerable in terms of preservation of the food.

Clearly, in .order to produce the snack—according to the present invention, the Mozzarella cheese cannot be used as it has a moisture content of 38-45%. To this regard, EP 0423650 does not provide useful teachings to one skilled in the art.

The snack according to the present invention is not produced with the addition of fat. In other words, none of the method steps contemplates the addition of animal or plant fat to a snack ingredient. Therefore, the food is free of added fat, i.e. it does not contain animal and plant fat beyond that naturally contained in the above-described ingredients.

For the purposes of the present invention, the phrase entire or substantially entire popcorn grain refers to popcorn which is not subjected to industrial milling methods, i.e. popcorn which is not systematically milled. Accordingly, this definition includes popcorn grains lacking a portion thereof for accidental and unexpected reasons.

Preferably, the food according to the' present invention comprises a plurality of substantially entire popcorn grains which are each physically separated from the others, in which each popcorn grain is completely or partially coated with at least one first layer of either a first cheese of the low moisture content type or a first cooked cheese directly contacting the popcorn grain.

Preferably, the first type of cheese is a hard texture cheese which is ripened for at least 3 months prior to be cooked and melted onto the popcorn. For example, the first cheese is selected from the group consisting of Parmigiano Reggiano, Grana Padano, Pecorino Romano, Pecorino Toscano, Pecorino Sardo, Sbrinz, Bagoss, semi-ripened or ripened Piave, Asiago, Montasio, or the first cheese is obtained by combining one or more of the above cheeses.

Preferably, each layer of melted cheese has a thickness in the range of 0.5-5 mm.

In one embodiment of the present invention, the food comprises at least a second layer of a second cheese enclosing partially or completely the first layer of the first cheese. The second cheese is equivalent to the first cheese in terms of moisture content and/or chemical and organoleptic characteristics, or else it is a cheese with a high moisture content and different chemical and organoleptic characteristics. In this embodiment, the first layer of cheese protects the popcorn grain as explained above, and therefore the second layer of cheese can be obtained by cooking or simply melting a cheese, for example Mozzarella cheese, having an initial moisture content of more than 35%.

In an embodiment the food of the present invention comprises additional ingredients such as chopped salt and/or pepper and/or spices and/or herbs dispersed in one or more of the cheese layers, or between the same cheese layers. In addition or alternatively, one or more of the layers of cheese are coated with a sauce reduction such as tomato sauce, ketchup, etc.

In an alternative embodiment of the invention, a layer of liquid corn starch is applied outwardly to at least one of the layers of cheese, and any flavors are adhered to the starch. In other words, corn starch is used as a natural glue for flavors or other ingredients which are desired to be associated with the food.

In a second aspect, the present invention relates to a method for producing a popcorn- and cheese-based food.

Particularly the method comprises the sequential steps of:
a) positioning a popcorn grain substantially entire on a first sized amount of a first cheese or positioning a first sized amount of the first cheese on the popcorn grain;
b) heating the first amount of the first cheese up to obtain the melting directly on the surface of the popcorn grain and the partial or whole inclusion of the popcorn grain in a first layer of the first cheese;
c) cooling the so obtained food;
d) wherein said step b) provides for the melting of the first cheese without cooking and the first cheese has an initial moisture content of less than 35%, or it provides for the melting and cooking of the first cheese independently from its moisture level and the finished food has a moisture content lower than 8%.

By melting a first cheese with a low moisture content directly onto the surface of the respective popcorn grain, the food thus obtained can be preserved over time without the requirement of using preservatives or storing the food in a refrigerator. Similarly, by melting and cooking the first cheese regardless of the moisture content of the first cheese just before the food is produced, the same advantages are obtained as long as the moisture of the food thus obtained is, less than 8%, preferably less than 5%, and more preferably in the range of 2-5%. In both cases, lyophilization of the food is avoided.

The method provides a tasty and protein-enriched food which is easy to be stored without the requirement of being lyophilized; therefore, energy savings are clear as compared to methods currently used for the production of traditional snacks.

Step a) can be performed according to three alternative approaches. In the first approach, the popcorn grain is positioned directly onto, and in direct contact with, a sized amount of the first cheese; for example, the sized amount of the first cheese is poured into a mold, and the popcorn grain is then positioned onto the cheese.

In the second approach, the first sized amount of the first cheese is positioned directly onto the popcorn grain; for example, the popcorn is first added to the mold, and the first sized amount of the first cheese is then poured onto it.

In the third approach, the popcorn grain is either sprayed with a spray of corn starch or wet with corn starch; corn starch acts as a glue, thereby allowing the cheese to adhere to the popcorn grain. For example, a plurality of popcorn grains coated with a thin layer of corn starch are mixed within a hopper containing grated cheese which is then adhered to the surface of the popcorn grains, which popcorn grains can then be transferred to an oven for heat treatment. Once the popcorn grains are heated, the already small amount of corn starch is absorbed by the cheese, and its presence becomes irrelevant for the organoleptic characteristics of the food.

Preferably the method comprises the further step of: d) positioning a second sized amount of the first cheese onto the popcorn grain. Step d) is time—subsequent step a) and precedes step b). In this circumstance, step b) provides for heating all of the first cheese up to melt and/or cook it and substantially completely enclose the popcorn grain into a layer of the first cheese.

If steps a) and b) are not be able to completely enclose the popcorn grain into the first layer of the first cheese, step d) ensures that the first layer is obtained substantially over the entire outer surface of the popcorn endosperm.

Preferably, the sized amounts of cheese are obtained by grating and sifting the cheese and then measuring the weight and/or volume of the sifted particles.

Preferably just before the step b) the first cheese has a moisture content lower than 35%. More preferably, the first cheese is a hard texture cheese which is ripened for at least 3 months prior to be melted, for' example a cheese selected from the group as recited above with reference to the food according to the present invention.

Preferably each heating step of the first cheese is carried out arranging the first cheese and the popcorn grain in a mold in its turn inserted, for a lapse of time comprised in the range of 20-250 seconds, into a microwave oven whose power is comprised in the range of 400-1000 W.

Preferably the medium dimension of the particles of the first grated cheese is comprised in the range 0.2-5 mm.

By combining the particle dimension of the cheese with the parameters set for the oven—(time, and power), the cheese can be completely melted and/or cooked (as desired .and depending on the requirements), and it can be applied as evenly as possible to the surface of the. popcorn. None of the steps contemplates the addition of fat to the ingredients of the snack.

Preferably, the method comprises one or more of the following additional steps:
f) melting, on a first layer of the first cheese, further layers of a first and/or second cheese, the latter being equal to the first cheese or being a cheese with high-moisture content;
g) mixing the first and/or second cheese with salt and/or pepper and/or spices and/or sauces and/or flavors;
h) strewing corn starch and/or salt and/or pepper and/or spices and/or sauces and/or flavors on the first layer of the first cheese and/or possible further cheese layers.

In practice, once the protective layer of the first cheese has been formed over the popcorn, the food may be further added with flavors, spices or other layers of a cheese which can even be of a different type than the first cheese. Corn starch can be used as a natural glue for these additional ingredients.

BRIEF DESCRIPTION OF THE DRAWINGS

Further details of the invention will be evident anyway from the following description course made with reference to the attached drawings, in which.

DETAILED DESCRIPTION OF THE PREFERRED EMBODIMENTS

Figure 1:
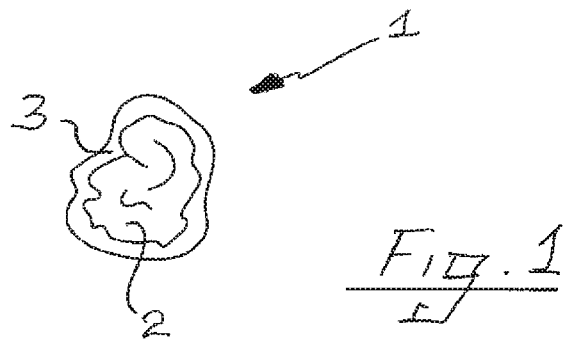
FIGS. 1-3 are schematic sectional views of, a food according to the present invention.

With reference to FIG. 1, there is shown a food 1 according to the invention, comprising a popcorn grain 2 coated with a layer 3 of a first melted cheese. Popcorn grain 2 is obtained by heating a corn grain up to make it explode with ejection of the endosperm. Corn can be heated using one of the methods known in the art, for example with hot air or in oil.

The layer 3 of the first melted cheese is preferably uniform in thickness, and it completely covers the popcorn grain 2 by directly contacting the respective outer surface, i.e. the endosperm.

In the example shown in FIG. 1, the cheese used for coating the popcorn grains is of the hard texture type, preferably Grana Padano. The moisture content of the first melted cheese is low, generally in the range of 4%-20%. A low moisture content corresponds to a high salt content, which promotes a prolonged preservation of the popcorn grain 2 over time.

Figure 3:
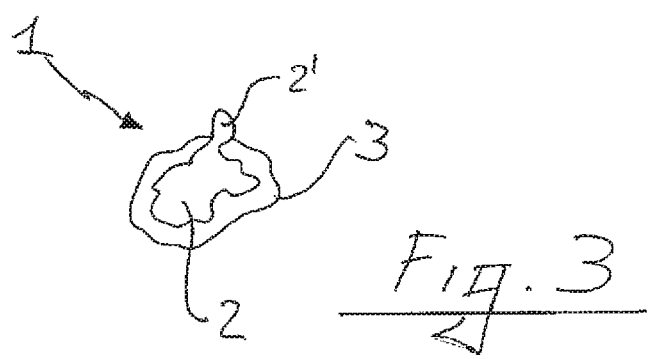

FIG. 3 shows an alternative, but not preferred, embodiment of—the food 1.wherein the popcorn grain 2 comprises a portion 2' which is not covered with the layer 3 of the first melted cheese, which is a 'cheese of' the low moisture content type.

Figure 2:
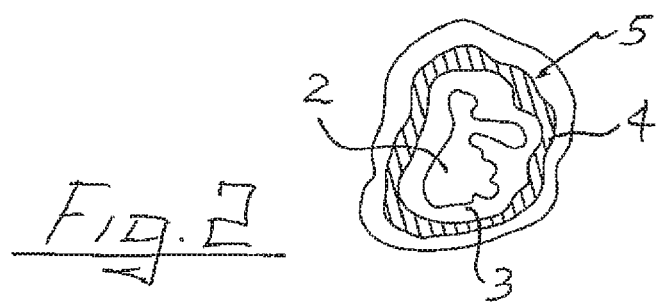

FIG. 2 shows another alternative embodiment in which the popcorn grain 2 is coated both with the first layer 3 of the first melted cheese completely enclosing it, and with two additional layers of a first or second cheese and/or spices/flavors, referred to by reference numerals 4 and 5 respectively. Particularly, in the embodiment shown in FIG. 2, the layer 4 directly applied to the first layer 3 is obtained by strewing a tomato sauce reduction and spices onto the food. The layer 5 is, for example, salt or a layer of a second cheese which can even be different from the first cheese, such as a cheese with a high moisture content. Generally, while the layers 4 and 5 shown in FIG. 2 completely enclose the layer 3 of the first cheese, they can also be incomplete layers, thereby leaving one or more portions of layer 3 exposed.

Generally, each of layers 3-5 has a thickness in the range of 0.5-5 mm and preferably of about 2 mm. When considering an ordinary size for the popcorn grains, this thickness can be obtained, for example, by using Grana Padano in an amount of approximately 5-10 grams.

FIGS. 1-3 show one popcorn grain 2. However, generally, the food 1 comprises a plurality of popcorn grains 2, each being at least partially enclosed into the layer 3 of melted cheese. Once the grains have been packaged in bulk, they may adhere to one another.

Figure 4:
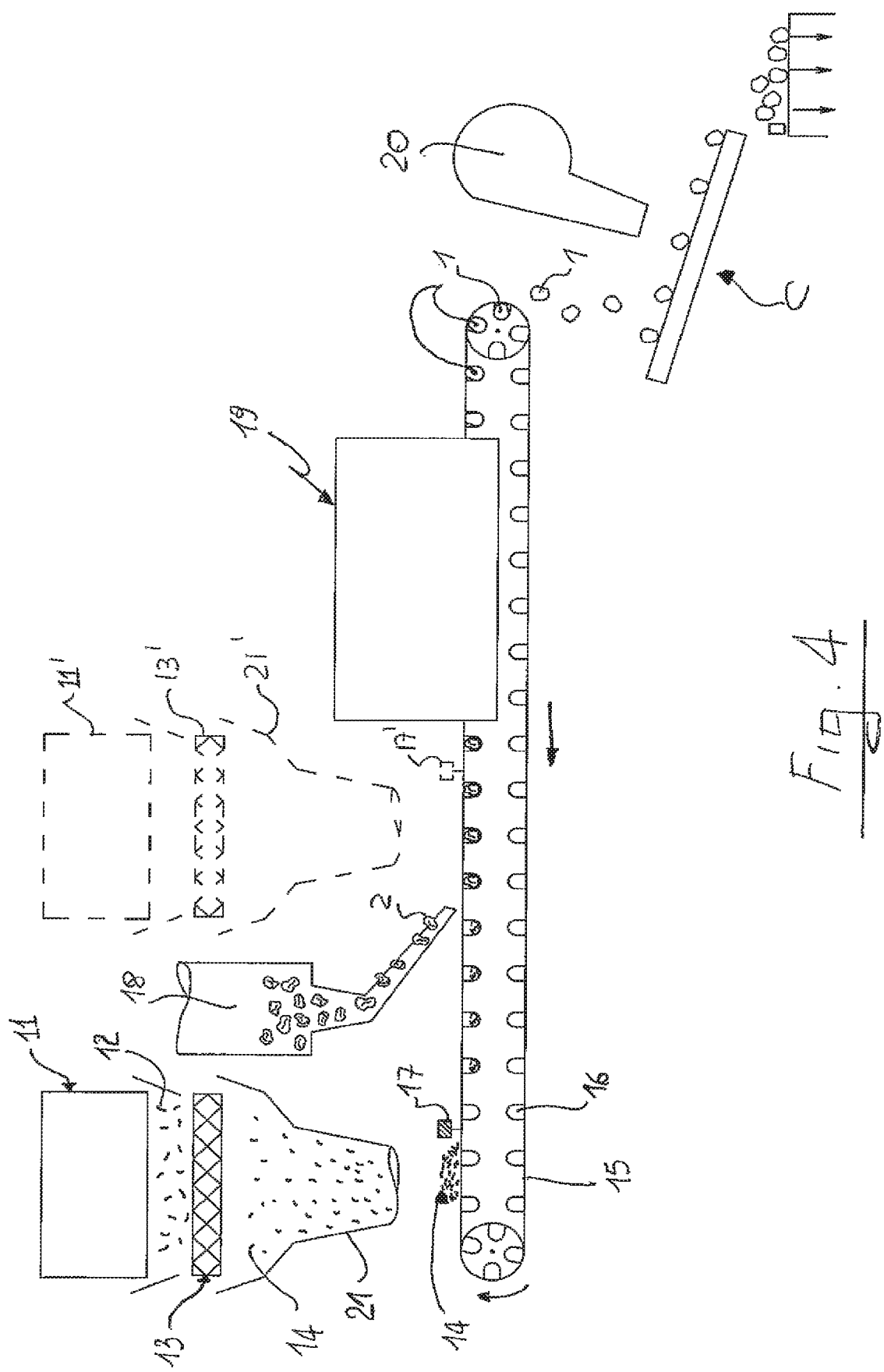
FIG. 4 is a schematic view of a first apparatus for producing a food according. to the present invention.

FIG. 4 shows an apparatus 10 for producing the food 1, 1'. For convenience, the method according to the present invention will be described with reference to this apparatus, although a unique correlation between them doesn't exist.

The apparatus 10 comprises a unit 11 which is operable for grating the first cheese. The flakes 12 of grated cheese are conveyed by gravity to a vibrating sieve 13 which is adjusted to allow the passage of cheese particles 14 having an average diameter in the range of 0.2-5 mm.

The cheese particles 14 fall by gravity onto a conveyor belt 15 comprising a plurality of food-grade silicone molds 16. A spatula 17 delivers the cheese particles 14, for example Grana Padano particles, into the molds 16 while preventing a surplus of cheese from remaining unused on the conveyor belt 15 externally to the molds 16. Therefore, the amount of particles 14 to be fed to the conveyor belt 15 is feedback—adjusted based on the speed of the belt.

Generally, the amount of particles 14 to be fed to the conveyor belt 15 per time unit is measured. For example, the conveyor 21 receiving the particles 14 from the sieve 13 is provided with a system for weighing the amount of particles 14 which are dropped on a per-time basis. Alternatively, other measurement methods can be used, for example based on the volume of particles to be fed to the belt 15.

In FIG. 4, the conveyor belt 15 is moved clockwise to transfer the filled molds 16 to a microwave oven 19. A unit 18 for feeding the popcorn grains 2 is located downstream of the spatula 17 and upstream of the oven 19 with respect to the direction of movement of the belt 15. The grains 2 are poured onto the particles 14 of grated cheese within the molds 16.

Preferably, the oven 19 is operated at a power of approximately 900 W, and the residence time of the molds 16 in the oven is in the range of 20-250 seconds.

In the oven, the cheese particles 14 are melted, thereby at least partially enclosing the respective popcorn grain 2 as explained above.

Downstream of the oven 19, the grains 2 coated with the melted, still warm cheese are discharged from the conveyor belt 15 and conveyed to a cooling section C comprising a blower 20 which directs a cold air blade onto the popcorn grains 2. Once the grains 2 have been cooled at ambient temperature, they are packaged as the food 1, for example in packages each containing 30 coated grains.

An optional second conveyor 21', an optional second sieve 13', etc. are shown in dashed lines as positioned downstream of the feed unit 18 in order to release a second sized amount of cheese into the molds 16 already containing the popcorn grains 2.

In an embodiment not shown in the Figures, a second unit for feeding grated cheese onto the popcorn grains 2 as well as a second oven are located downstream of the oven 19. In this embodiment, once the popcorn grains 2 have been provided with more grated cheese, they are re-heated. In' this way, the layer 3 of melted cheese on each grain 2 is increased in thickness, thereby ensuring that the external surface of the grain is completely covered. Preferably, the cheese used is again the first cheese, which is delivered in sized amounts onto the conveyor belt 15 as described hereinabove.

In addition, the apparatus 10 is preferably provided with a device (not shown) for optically checking the grains 2 as they exit from the oven. This device automatically performs an optical analysis of all the grains 2 in order to detect any abnormalities with respect to the desired parameters of uniformity and/or thickness for the layer 3 of cheese. The grains 2 which are not successfully prepared are discarded.

Figure 5:
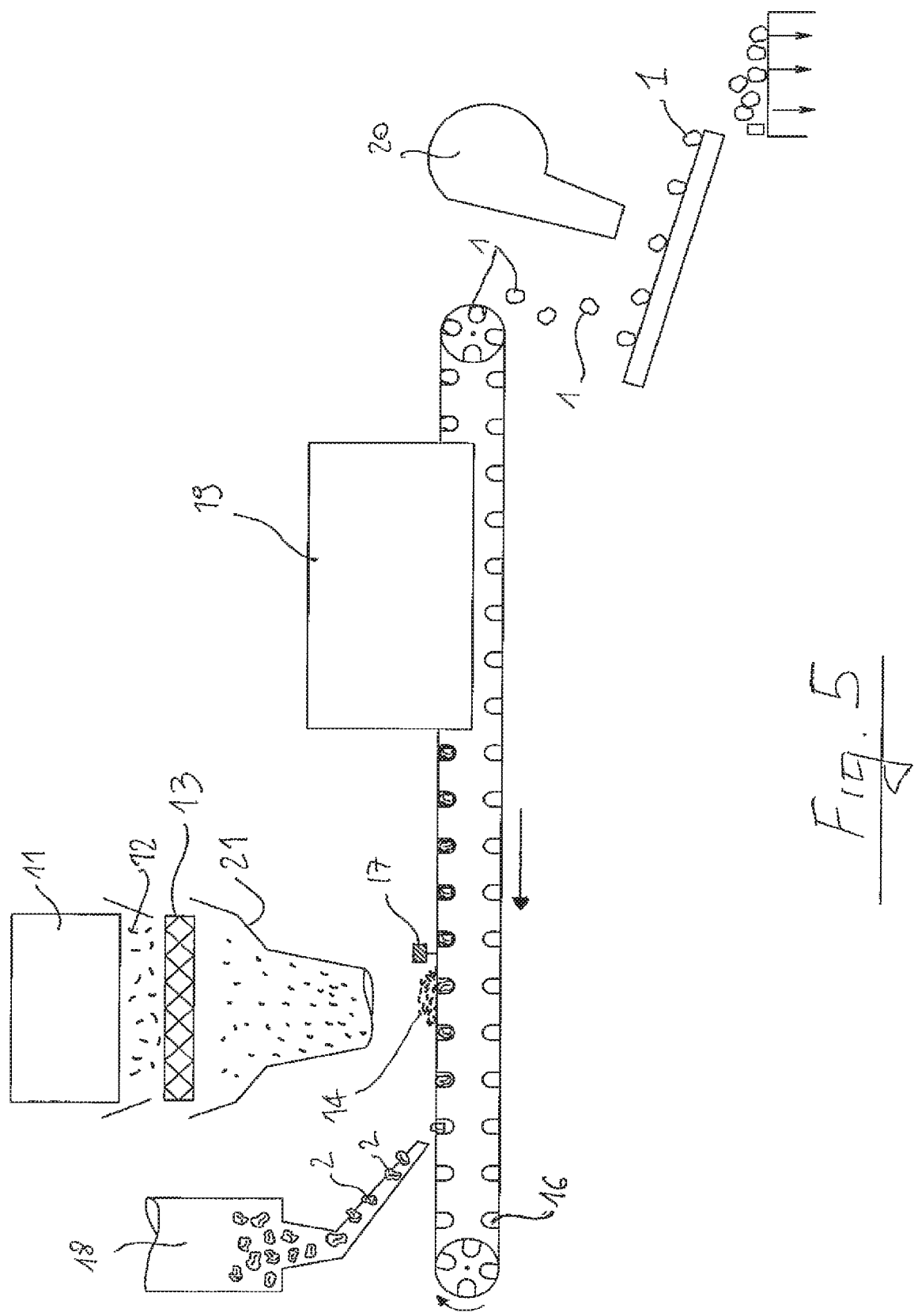
FIG. 5 is a schematic view of a second apparatus for producing a food according to the present invention.

FIG. 5 shows a second embodiment of the apparatus according to the present invention, in which the popcorn grains 2 are first positioned into the respective molds 16; the conveyor 21 for delivering the grated cheese 14 onto the grains 2 within the molds 16 is located downstream of the feed unit 18 with respect to the direction of advancement of the belt 15. In this embodiment, the grains 2 are covered with the grated cheese 14 before entering into the oven 19. The other features of the apparatus are equivalent with respect to the first embodiment.

Figure 6:
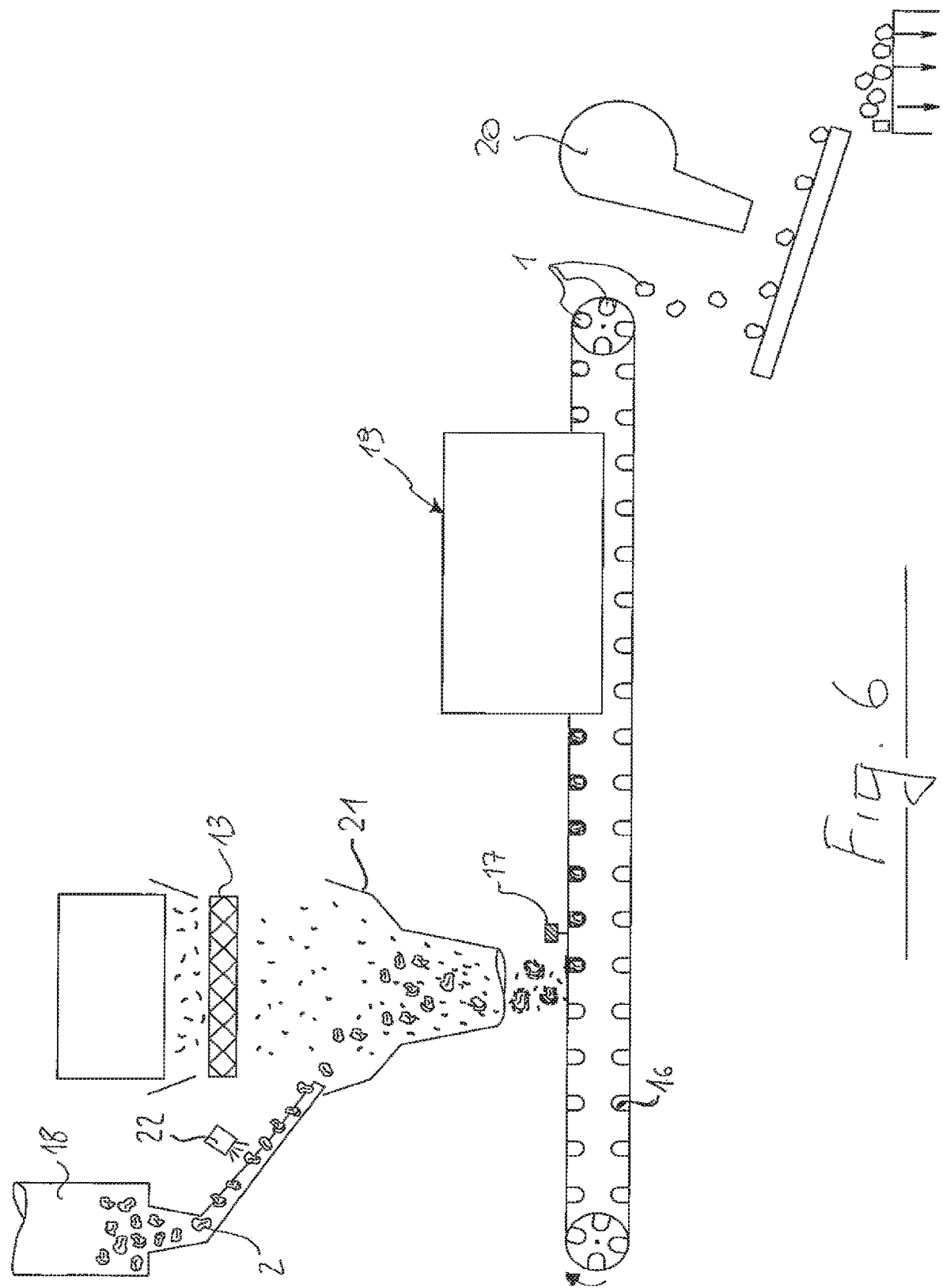
FIG. 6 is a schematic view of a third apparatus for producing a food according to the present invention.

FIG. 6 shows a schematic view of a third embodiment of the apparatus in which the feed unit 18 is feeding the popcorn grains 2 directly to the conveyor 21 carrying the grated cheese coming from the sieve 13. At least one nozzle 22 sprays the popcorn grains 2 with liquid corn starch; the corn starch acts as a natural glue by promoting the adhesion of the grated cheese to the grains 2 falling into the molds 16 which are already substantially covered with cheese.

What is claimed is:

1. A method for producing a food (1) based on popcorn and cooked cheese, the method comprising:

a) positioning a popcorn grain (2) substantially entire directly onto and in direct contact with, a first sized amount of a first cheese, wherein the first sized amount of the first cheese is poured into a mold, and the popcorn grain is then positioned onto the cheese or positioning the first sized amount of the first cheese directly onto the popcorn grain (2), wherein the popcorn grain is first added to the mold, and the first sized amount of the first cheese is then poured thereon;

b) cooking the first amount of the first cheese up to a sufficient temperature to melt the first sized amount of the first cheese directly on the surface of the popcorn grain (2) to obtain a partial or whole inclusion of the popcorn grain (2) in a first layer of the first cheese; and c) cooling the so obtained food (1);

wherein said step b) provides for the melting and cooking of the first cheese such that air bubbles are formed in the cheese and the cheese becomes crispy, whereby the cheese is cooked until the finished food (1) has a moisture content lower than 8%;

and wherein no animal or plant fat is added to any of the ingredients.

2. The method according to claim 1, further comprising the step of:

d) positioning a second sized amount of the first cheese on the popcorn grain (2);

wherein the step d) is subsequent to the step a) and prior to the step b), and the step b) provides for the heating of the whole first cheese up to obtain the melting and/or the cooking thereof and to obtain the substantially complete inclusion of the popcorn grain (2) in a first layer (3) of the first cheese.

3. The method according to claim 1, wherein the step of positioning a sized amount of cheese on the popcorn grain (2) is carried out by coating the popcorn grain (2) with a film of corn starch and causing the cheese to adhere to the corn starch.

4. The method according to claim 1, wherein said sized amount is obtained by grating and sifting said first cheese and measuring the weight and/or volume of sifted particles (14) of first cheese.

5. The method according to claim 4, wherein the medium dimension of the particles (14) of the first grated cheese is in the range of 0.2-5 mm.

6. The method according to claim 1, wherein said first cheese is a hard texture cheese, matured at least 3 months before the respective melting.

7. The method according claim 1, wherein the heating step of the first cheese is carried out by arranging the first cheese and the popcorn grain (2) in a mold (16), which is in turn inserted, for a period of time in the range of 20-250 seconds, into a microwave oven (19) whose power is in the range of 400-1000 W.

8. The method according to claim 2, comprising one or more of the further steps:

f) melting, on a first layer (3) of the first cheese, further layers (5) of a first and/or second cheese, the second cheese having a moisture content equal to or higher than the first cheese;

g) mixing the first and/or second cheese with salt and/or pepper and/or spices and/or sauces and/or flavors;

h) strewing corn starch and/or salt and/or pepper and/or spices and/or sauces and/or flavors on the first layer of the first cheese and/or further cheese layers.

* * * * *